US005992866A

United States Patent [19]

Frigo et al.

[11] Patent Number: 5,992,866

[45] Date of Patent: Nov. 30, 1999

[54] MOTOR-VEHICLE REAR SUSPENSION

[75] Inventors: Guido Frigo; Andrea Santini; Michele Spina, all of Orbassano, Italy

[73] Assignee: C.R.F. Società Consortile per Azioni, Orbassano, Italy

[21] Appl. No.: 08/989,182

[22] Filed: Dec. 11, 1997

[30] Foreign Application Priority Data

Dec. 13, 1996 [IT] Italy ................................ TO96A1022

[51] Int. Cl.$^{6}$ ................................ B60G 3/18; B60G 3/26

[52] U.S. Cl. ............................ 280/124.133; 280/124.148; 280/124.153; 280/5.52

[58] Field of Search ..................... 280/124.132, 124.133, 280/124.145, 124.148, 124.149, 124.153, 5.52, 5.521

[56] References Cited

U.S. PATENT DOCUMENTS

| | | | |
|---|---|---|---|
| 4,273,356 | 6/1981 | Sakata et al. | 280/124.144 |
| 4,715,615 | 12/1987 | Kujima et al. | 280/124.133 |
| 4,911,467 | 3/1990 | Alesso et al. | 280/124.133 |

*Primary Examiner*—Christopher P. Ellis
*Assistant Examiner*—Andrew J. Ririe
*Attorney, Agent, or Firm*—Sughrue, Mion, Zinn, Macpeak & Seas, PLLC

[57] ABSTRACT

There is described a motor-vehicle rear suspension comprising a longitudinal arm whose rear end carries the wheel support and whose front end is connected to the motor-vehicle body by a connecting rod, this front end being also connected to an auxiliary arm which is on its turn connected to the motor-vehicle body by means of a connecting-rod. The wheel support is further connected to the motor-vehicle body by means of a transverse linking rod. The longitudinal arm has an intermediate swivel joint and a further articulated arm is provided which connects the wheel support to the motor-vehicle body.

2 Claims, 5 Drawing Sheets

22
26 9 25 27
17
6
7
3
10
13a 15 12 4
8
14 20
29
11
13 29
18 19

1
2
3
4
5
6
7
8
9
10
11
12
13
13a
13b
14
15
16
17
18
19
19a
20
21
22
25
26
27

22
25
27
10
20
11
19
8
7
18
9
26
6
3
4
29
29
12
15
14
17
13
13a 20
21
19
15
16
17
19a
14
30
27
22
12
25
28
26
10
9
11
18
5
4
3
2

MOTOR-VEHICLE REAR SUSPENSION

BACKGROUND OF THE INVENTION AND RELATED ART

The present invention relates to motor-vehicle rear suspensions of the type comprising, for each wheel:

a longitudinal arm having one end pivotally mounted on the fixed structure of the motor-vehicle around an axis directed transversally to the longitudinal direction of the motor-vehicle and one end carrying a respective wheel support, an auxiliary arm connected at one end to the longitudinal arm and having the other end connected to the fixed structure of the motor-vehicle, a connecting-rod element interposed in the connection between said auxiliary arm and the fixed structure of the motor-vehicle, a further linking rod interposed between the longitudinal arm and the fixed structure of the motor-vehicle and directed transversally to the longitudinal direction of the motor-vehicle, and spring and damping means interposed between the longitudinal arm and the fixed structure of the motor-vehicle.

A suspension of the above indicated type is disclosed for example in German patent application DE-A-34 26 942.

SUMMARY OF THE INVENTION

The object of the present invention is that of providing a motor-vehicle rear suspension of the above indicated type which has reduced dimensions and weight while insuring best performance of the motor-vehicle at any running condition.

In view of achieving this object, the invention provides a rear suspension of the above indicated type, characterized in that the longitudinal arm has an intermediate swivel joint, so that the wheel support is free to rotate around an axis of said swivel joint with respect to the front part of the longitudinal arm, a further articulated arm being provided which connects the wheel support to the fixed structure of the motor-vehicle.

Due to the above indicated feature, the rear suspension according to the invention provides better running comfort. In fact, during the upward vertical movement of the rear suspension of the motor-vehicle, the wheel support moves with respect to the front part of the longitudinal arm by rotating around the axis of said intermediate swivel joint so as to favor an increase in the motor-vehicle pitch, which is most desirable from the point of view of running comfort.

According to a further feature the said intermediate swivel joint is provided by coupling two swivel joint elements together, one of which has a fork-like shape, so that, when designing the suspension, it is possible to achieve a desired control of the torque transmitted in the plane in which the two fork arms lie. This enables a predetermined toe-in angle of the wheel to be obtained when the vehicle is in a curve.

BRIEF DESCRIPTION OF THE DRAWINGS

Further features and advantages of the invention will become apparent from the description which follows with reference to the annexed drawings, given purely by way of non limiting example, in which.

DETAILED DESCRIPTION OF THE INVENTION

Figure 1:
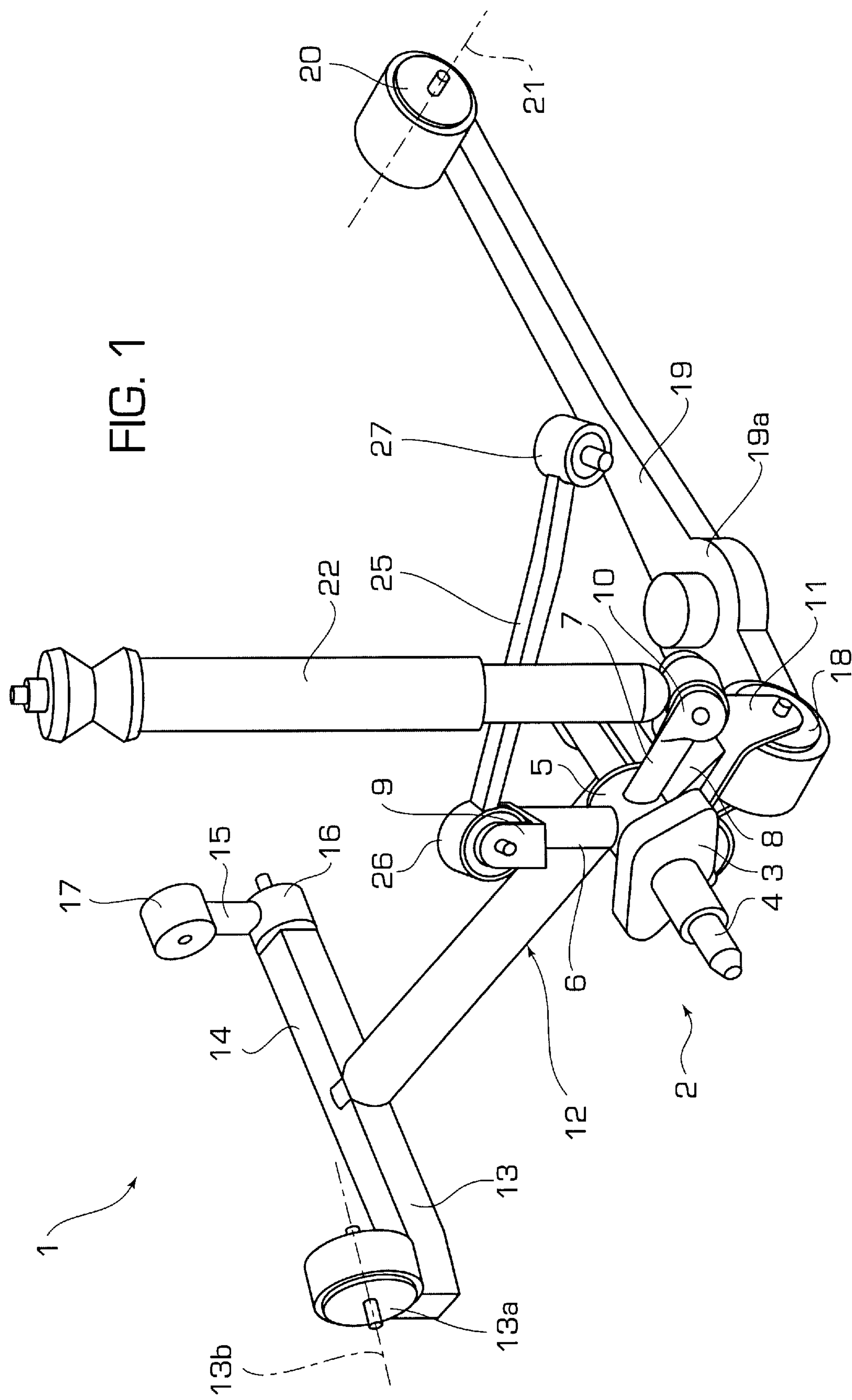
FIG. 1 is a perspective view of a part of the suspension according to the invention which is associated with one of the two rear wheels of the motor-vehicle, the remaining part being symmetrical and identical to the one illustrated.

In FIG. 1, numeral 1 generally designates the left part of a rear suspension of a motor-vehicle, i.e. the part of the suspension which is to be associated with the rear left wheel of the motor-vehicle. The right part of the suspension, not shown, is identical and symmetrical to the part shown in FIG. 1.

Numeral 2 generally designates the support of the rear left wheel of the motor-vehicle, including a plate 3 carrying a wheel spindle 4. In the illustrated example, the wheel support further includes a body 5 from which there extend arms 6, 7, 8 ending with forks 9, 10, 11. All the above mentioned elements are rigidly connected to each other and form the above mentioned wheel support. Naturally, the particular shape of the wheel support 2 shown in FIG. 1 is purely illustrative and may be varied at will as a function of design needs.

Reference numeral 12 designates a longitudinal arm carrying the wheel support 2 at its lower end and extending forwardly into a transverse bracket 13 which is to be pivotally connected at its front end to the motor-vehicle body by means of a support **13*a*, known per se including a rubber bush having an articulation axis 13*b*. The bush of the damping support 13*a*, which can be made in any known way, is adapted to deform so as to allow tilting of the longitudinal arm 12 not only around axis 13*b* but also around an axis orthogonal thereto, so that the connection provided by support 13*a* is for all purposes similar to a spherical articulation. At the front side of the longitudinal arm 12 there extends an arm portion 14 (which in the illustrated embodiment forms, along with bracket 13, a single transverse arm rigidly connected to the front end of the central cylindrical portion of the longitudinal arm 12) said arm portion 14 forming an auxiliary arm which is also connected to the motor-vehicle body with the interposition of a small connecting-rod 15 having end articulations 16, 17**.

The fork 11 of the wheel support 2 is for connection by means of an articulation 18 to a transverse arm 19 whose opposite end is connected to the motor-vehicle body by means of a spherical articulation 20 constituted by a damping support having an axis 21. The fork 10 carried by the wheel support 2 is instead used for connection of the lower end of a shock absorber 22 whose upper end is to be connected to the motor-vehicle fixed structure. Naturally, a spring is further provided, in a way known per se, such as a helical spring (not shown), which is to be interposed between the motor-vehicle body and one element of the suspension, for example to be supported at its lower end on part **19*a* of the transverse arm 19**.

According to the invention, the longitudinal arm 12 has an intermediate swivel joint 23 having an articulation axis 24. The swivel joint 23 is not a spherical swivel joint, and allows relative rotation of the two joint elements only around the axis 24. Because of the presence of the swivel joint 23, the wheel support 2 is able to rotate around axis 24 with respect to the front part of the longitudinal arm 12.

Yet according to the invention there is provided a further articulated arm 25 connected at its ends by spherical joints

26, 27 respectively to fork 9 of wheel support 2 and the fixed structure of the motor-vehicle.

Figure 2:
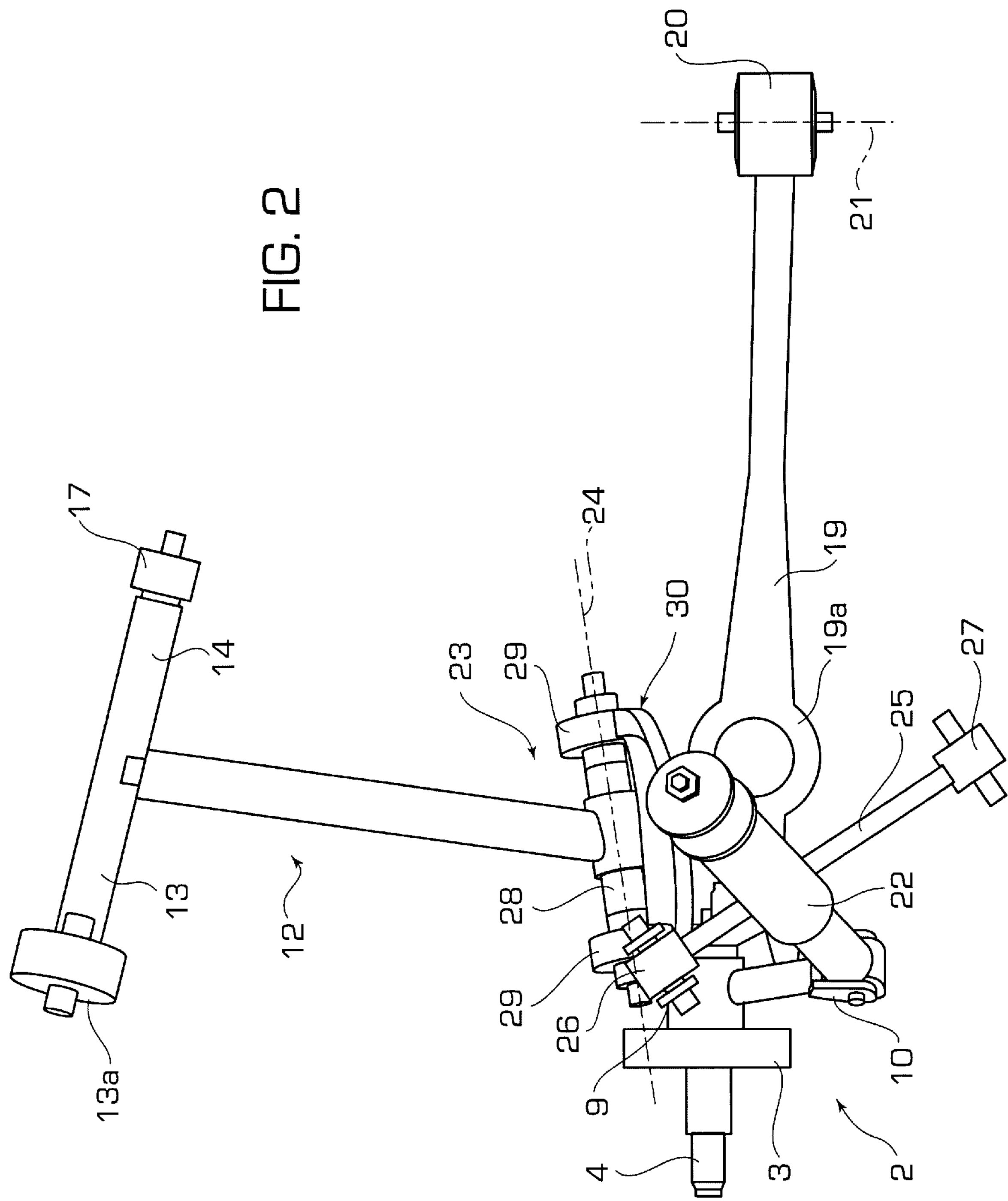
FIG. 2 is a plan view of the suspension of FIG. 1.
Figure 3:
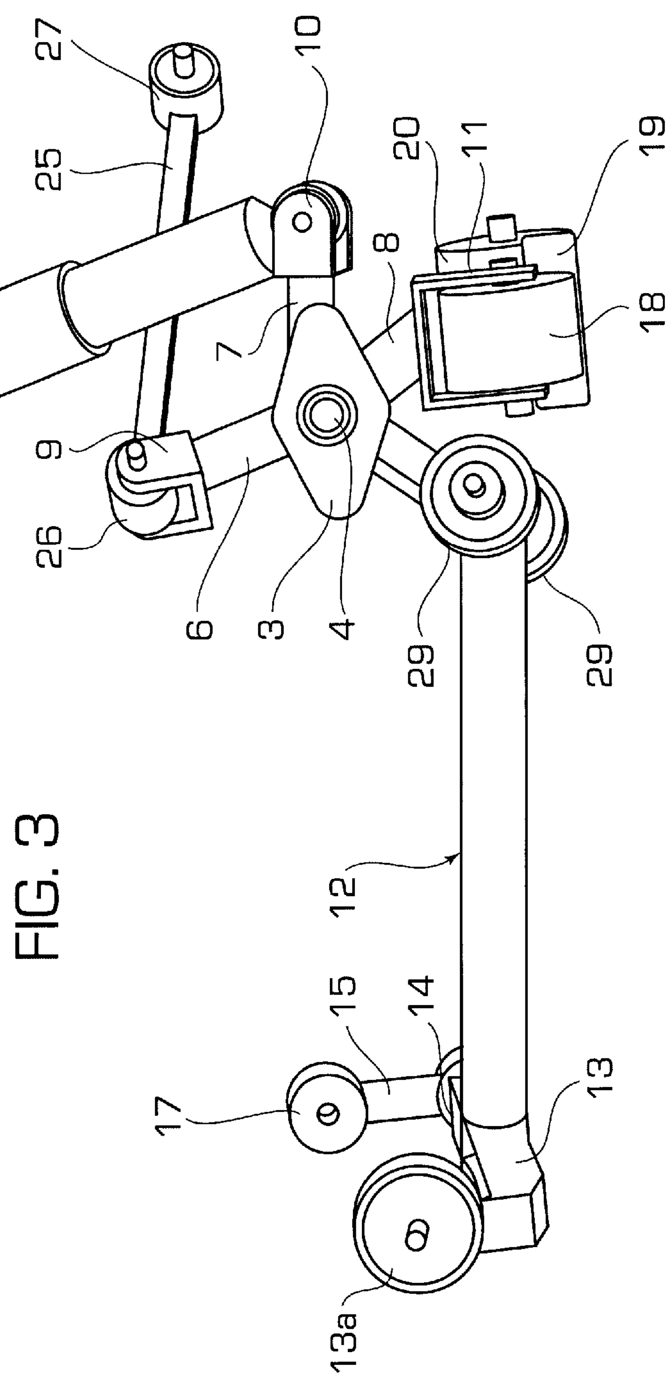
FIG. 3 is a side view of the suspension of FIG. 1.
Figure 4:
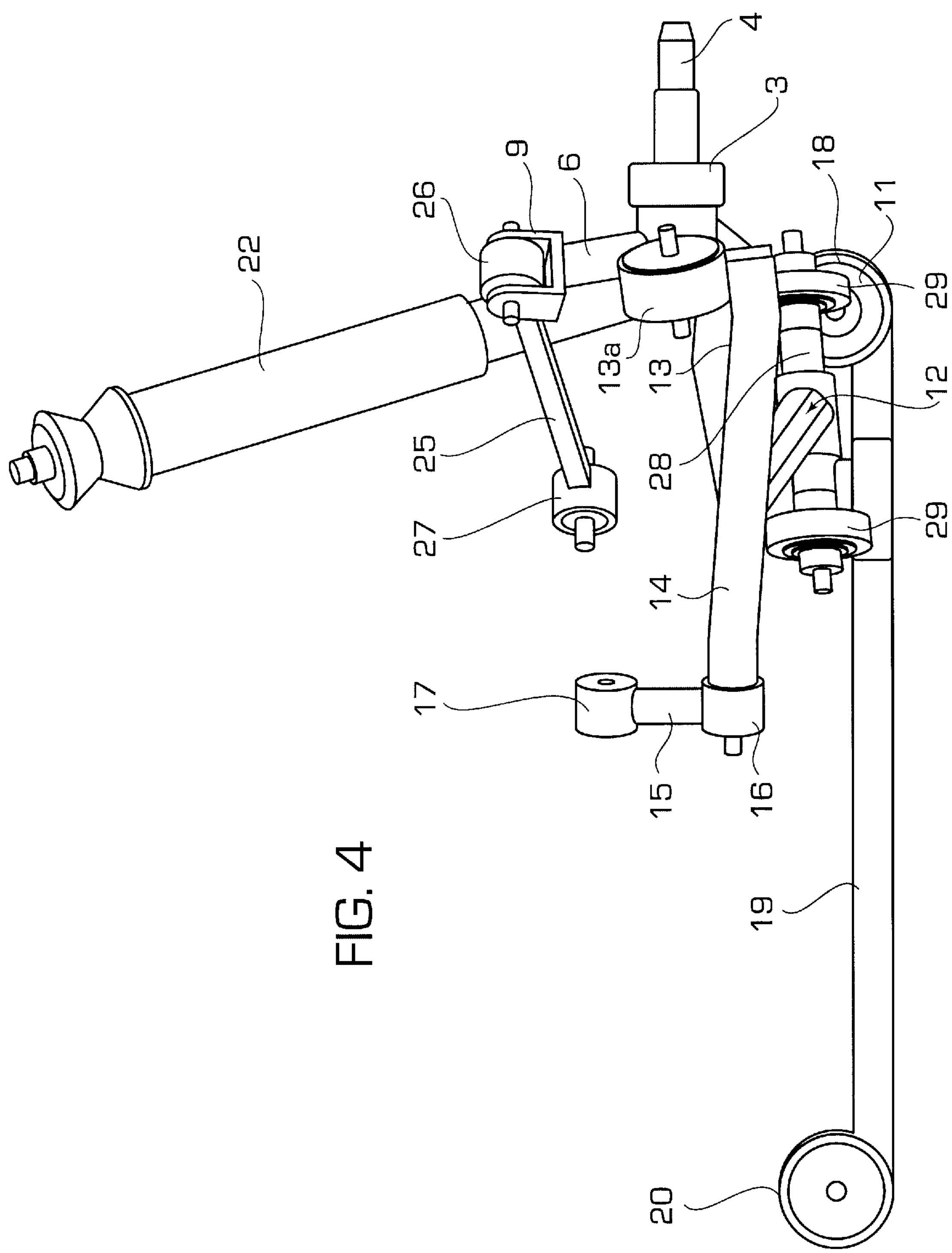
FIG. 4 is a front view of the suspension of FIG. 1.
Figure 5:
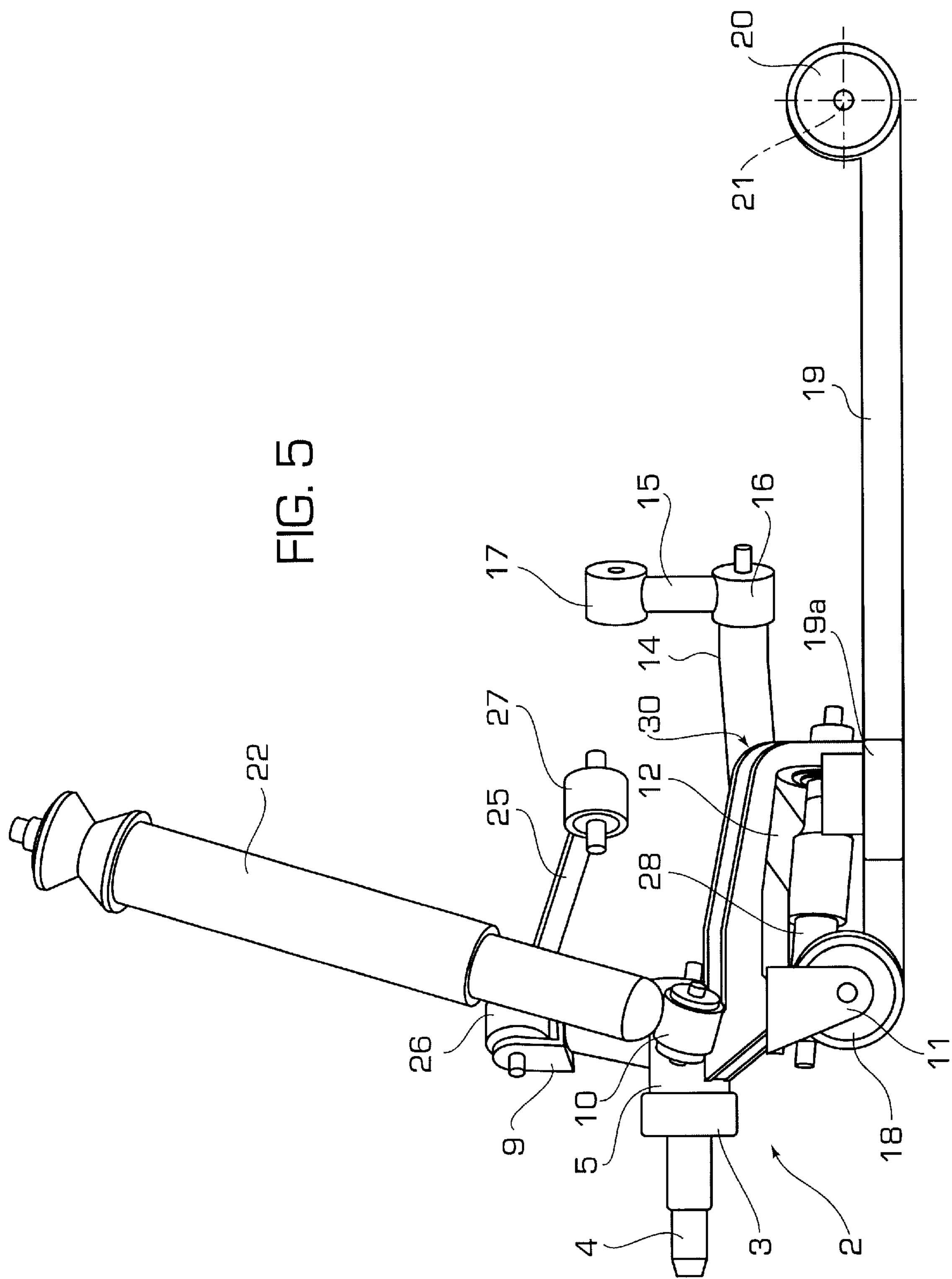
FIG. 5 is a rear view of the suspension of FIG. 1.

As clearly shown in FIG. 2, in the example illustrated in the drawings, the swivel joint 23 is provided by coupling the ends of a transverse axle 28 carried by the auxiliary arm 12 to the two brackets 29 of a fork-shaped element 30 carried by the wheel support 2. The fork-like shape of element 30 causes this element and the transverse axle 28 to exchange forces with each other which generate a torque in the plane of the brackets 29 of fork 30. This arrangement enables, when designing the suspension, a desired behavior of the wheel in a curve and particularly a tendency of the wheel to increase its toe-in angle, to be obtained. At the same time, the provision of the swivel joint 23 enables the wheel support 2 to rotate around the axis 24 with respect to the front part of the longitudinal arm 12 during the vertical movements of the suspension, which also enables the designer, when designing the suspension, to obtain that an upward movement of the wheel with respect to the motor-vehicle structure is associated with an increase of the motor-vehicle pitch, with resulting advantages for the running comfort.

Obviously, the shape of the various elements described above may also be different from that shown purely by way of example. The only essential features are the provision of an intermediate swivel joint 23 in the longitudinal arm 12 on one hand, and the provision of a further articulated arm 25 on the other hand.

Naturally, while the principle of the invention remains the same, the details of construction and the embodiments may widely vary with respect to what has been described and illustrated purely by way of example, without departing from the scope of the present invention.

What is claimed is:

1. Motor-vehicle rear suspension, comprising, for each wheel:

a longitudinal arm having one end pivotally mounted on a fixed structure of the motor-vehicle around an axis directed transversally to the longitudinal direction of the motor-vehicle, and one end carrying a respective wheel support, an auxiliary arm connected at one end to the longitudinal arm and having the other end connected to the fixed structure of the motor-vehicle, a connecting-rod element interposed in the connection between said auxiliary arm and the fixed structure of the motor-vehicle, a further linking rod interposed between the longitudinal arm and the fixed structure of the motor-vehicle and directed transversally to the longitudinal direction of the motor-vehicle, and damping means interposed between the wheel support and the fixed structure of the motor-vehicle, wherein the longitudinal arm has an intermediate swivel joint so that the wheel support is free to rotate around an axis of said intermediate swivel joint with respect to a front part of the longitudinal arm, a further articulated arm being provided, the further articulating arm connecting the wheel support to the fixed structure of the motor-vehicle.

2. Suspension according to claim 1, wherein the said intermediate swivel joint comprises two swivel joint elements one of which has a fork-like shape.

* * * * *